Sept. 28, 1926.

W. A. GIBBS

ANIMAL TRAP

Filed May 11, 1923     6 Sheets-Sheet 1

1,601,525

Inventor-
Walter A. Gibbs.
by his Attorneys-
Howson & Howson.

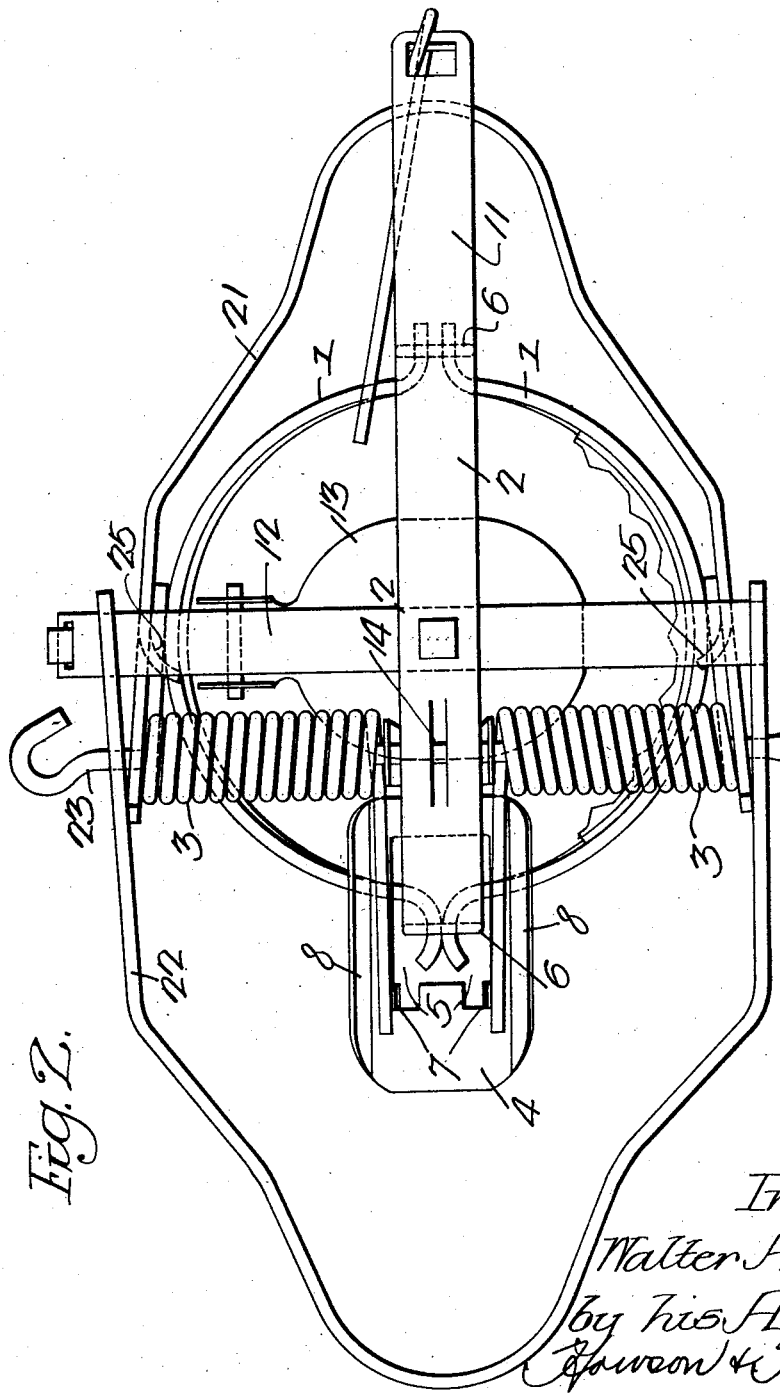

Sept. 28, 1926. 1,601,525
W. A. GIBBS
ANIMAL TRAP
Filed May 11, 1923     6 Sheets-Sheet 3
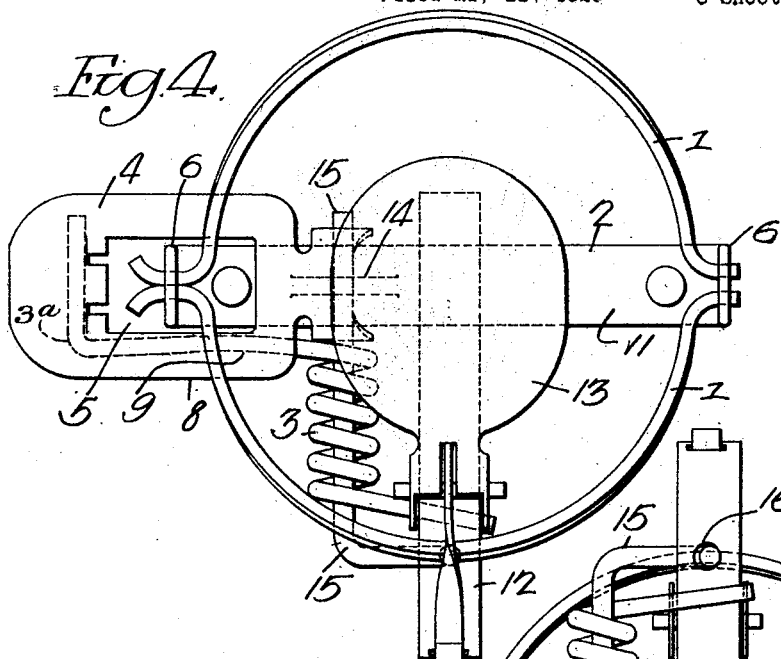
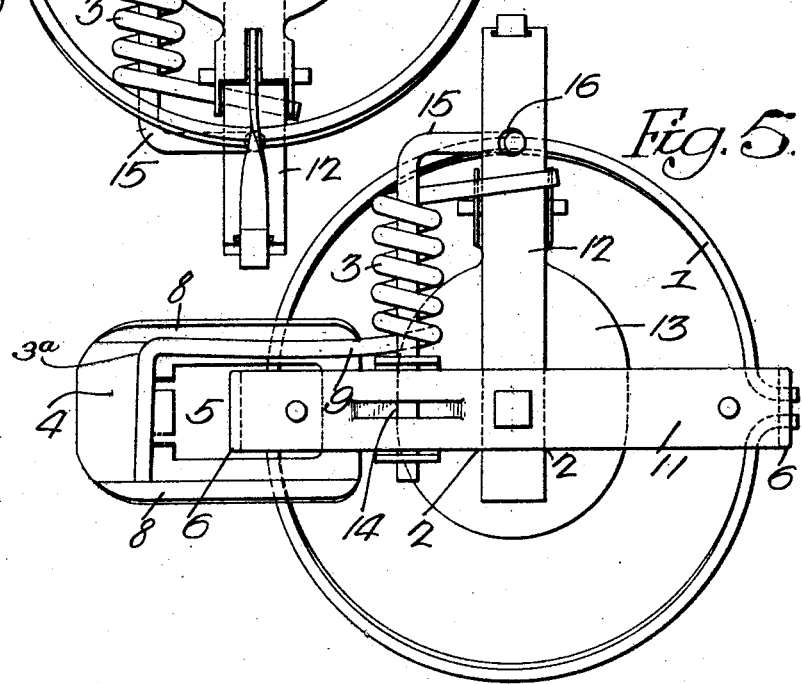
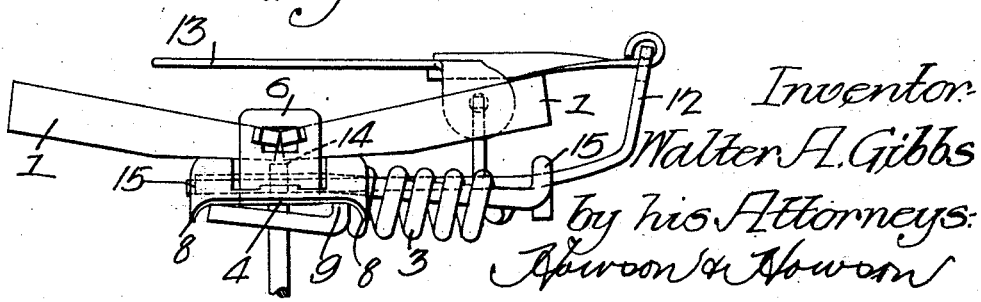

Sept. 28, 1926.  
W. A. GIBBS  
ANIMAL TRAP  
Filed May 11, 1923
1,601,525
6 Sheets-Sheet 4
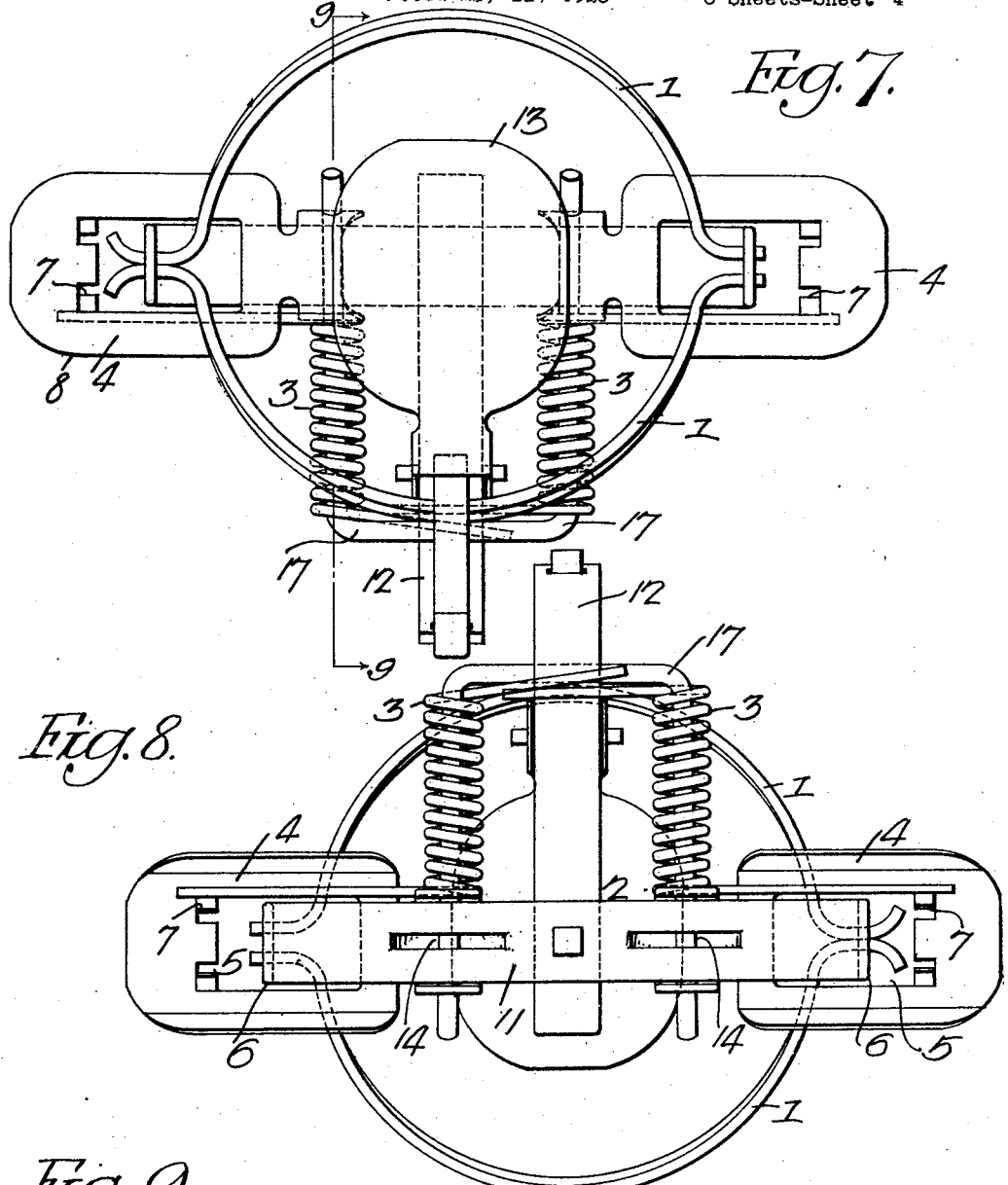
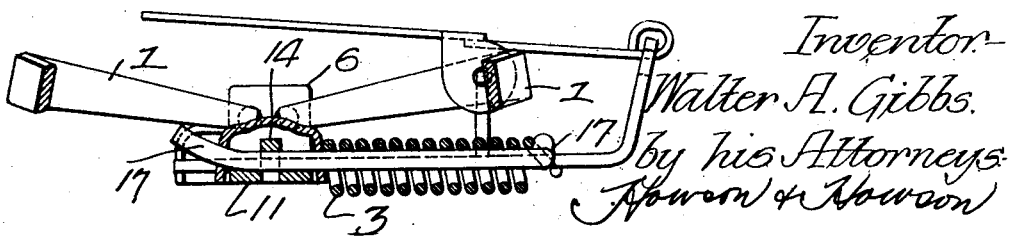
Inventor-
Walter A. Gibbs.
by his Attorneys
Howson & Howson Sept. 28, 1926.
W. A. GIBBS
ANIMAL TRAP
Filed May 11, 1923    6 Sheets-Sheet 5
1,601,525
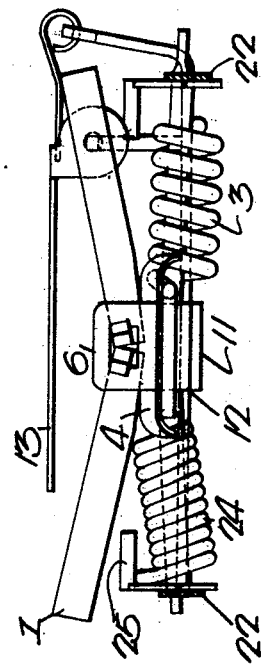
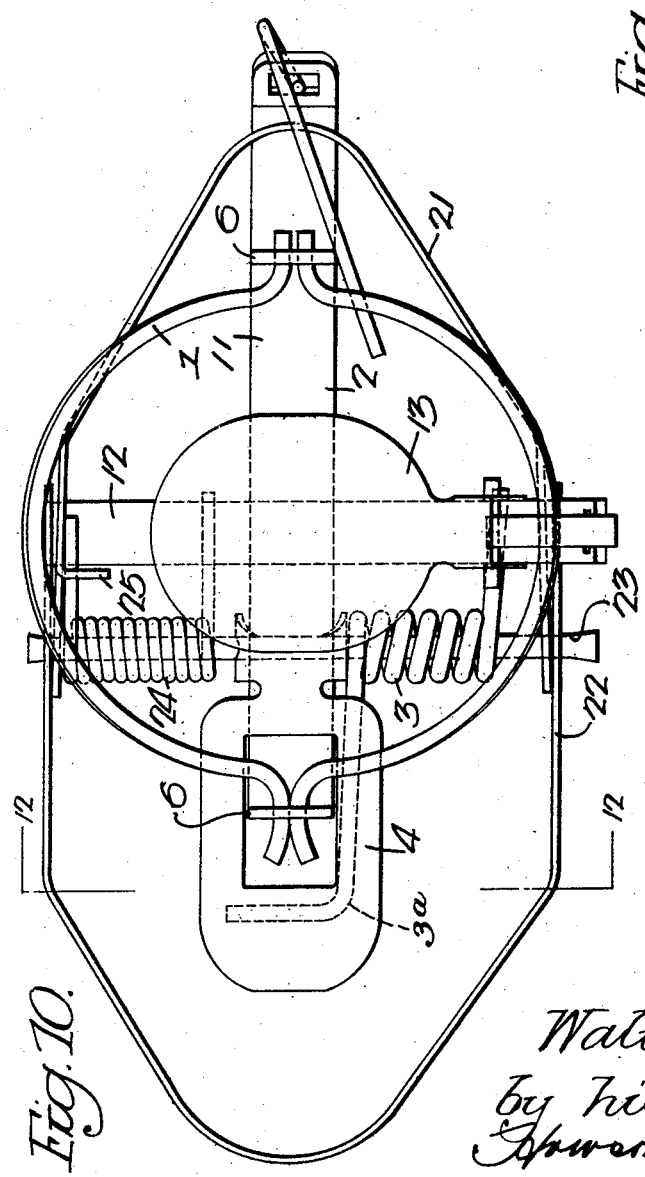

Sept. 28, 1926.
W. A. GIBBS
1,601,525
ANIMAL TRAP
Filed May 11, 1923   6 Sheets-Sheet 6
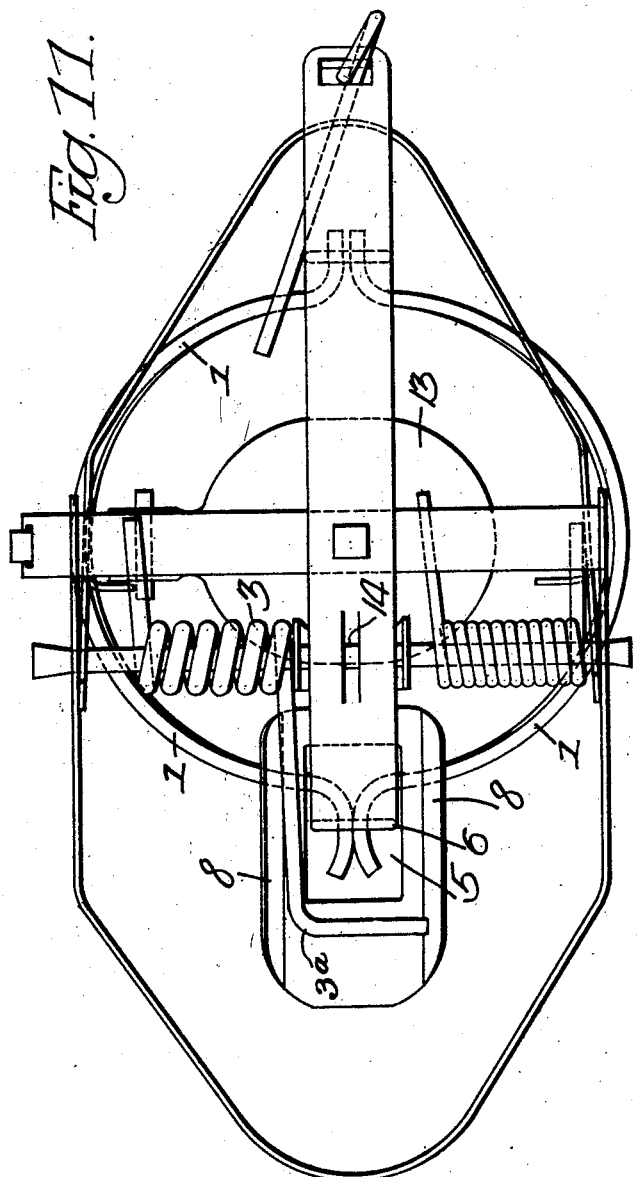
Inventor-
Walter A. Gibbs.
by his Attorneys-
Howson & Howson Patented Sept. 28, 1926.

1,601,525

UNITED STATES PATENT OFFICE.

WALTER A. GIBBS, OF HOLLY OAK, DELAWARE.

ANIMAL TRAP.

Application filed May 11, 1923. Serial No. 638,212.

This invention relates to animal traps, and resides in the novel and advantageous features of construction hereinafter fully set forth and illustrated in the attached drawings, in which:

Fig. 2, is an inverted plan view of the trap;

Fig. 3, is a section on the line 3—3, Fig. 1;

Fig. 4, is a plan view of a trap illustrating a modification of the invention;

Fig. 6, is a side elevation of the trap illustrated in Fig. 4;

Fig. 7, is a plan view of another trap embodying a feature of the invention;

Fig. 8, is an inverted plan view of the trap illustrated in Fig. 7;

Fig. 9, is a section on the line 9—9, Fig. 7;

Fig. 10, is a plan view of still another trap embodying a further modification of the invention;

Fig. 11, is an inverted plan view of the trap illustrated in Fig. 10, and

Fig. 12, is a section on the line 12—12, Fig. 10.

Figure 5:
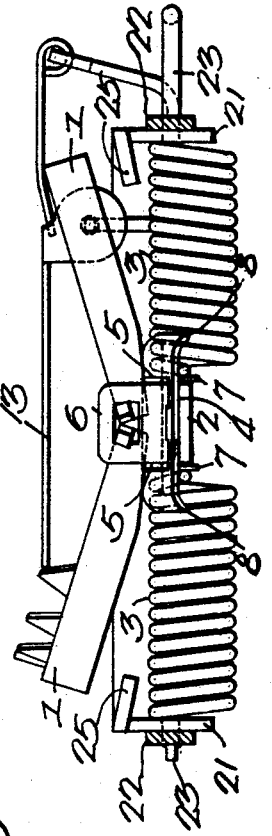
Fig. 5, is an inverted plan view of the trap illustrated in Fig. 4.

With reference to the drawings, the trap in each instance comprises a pair of cooperating jaws 1, 1, mounted upon a suitable frame or base 2 and actuated by means of a spring or springs 3, 3, operating through the medium of a lever 4 adapted to force the jaws together. The lever 4 is commonly made, as illustrated, with an aperture 5, and when the trap is sprung embraces the arms in the well known manner.

It is customary in using apparatus of this type and with a closing lever of the type illustrated, to so arrange the actuating springs 3, 3, that one end of the spring, or of each of the springs when more than one is employed, bears against the said lever, the other end of the spring bearing against a suitable part of the frame, or, where the trap involves two sets of jaws, against the latter. With this construction, there is a tendency for the spring ends underlying the lever 4 to move inwardly under the aperture and to bear against the sides of the jaws 1, 1, or against the sides of the upstanding portion 6 of the frame 2, in which the jaws 1, 1, are journaled, this, by reason of the frictional bearing of the spring ends against the said parts, materially reducing the efficiency of the trap in operation.

In the present instance I provide means for retaining the spring ends entirely clear of the aperture 5 and underneath the solid portions of the lever 4, thereby preventing contact of the spring ends with the jaws or with the frame. Although various means may be employed for so holding the ends of the springs, I have found it of advantage to form lugs 7, 7, which project from the under side of the lever 4 and prevent movement of the spring ends beyond the side edges of the aperture 5, these lugs being formed in the present instance by stamping out and bending down portions of the lever, as clearly illustrated.

Figure 1:
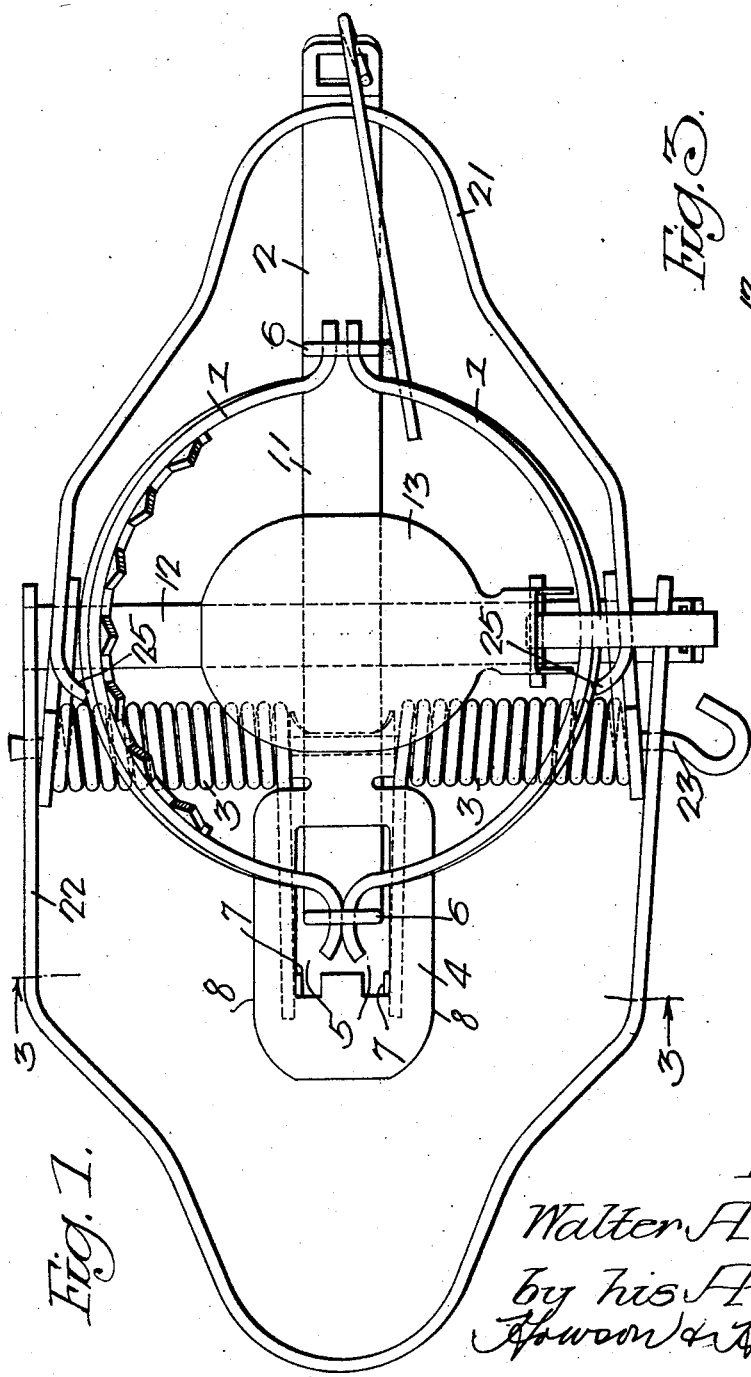
Figure 1, is a plan view of a trap illustrating my invention.

As illustrated in Figs. 10, 11 and 12, in which the parts corresponding to the designated parts of Figs. 1, 2 and 3, are given the same reference numerals, the end of the spring 3 which underlies the lever, is bent approximately at right angles, as indicated at 3ª, so that the extremity of the spring will bear against one of the downturned side flanges 8 of the said lever, and will thereby retain the spring clear of the aperture 5, and from the sides of the jaws 1, 1, and the upturned portion 6 of the base.

Figures 4 to 9, inclusive, while illustrating traps different in detail from those illustrated in the remaining figures, still involve elements corresponding to the previously designated parts of the other traps, and the same reference numerals are used in these views as in the preceding views to denote the corresponding parts. Thus, for example, in Figs. 7, 8 and 9, the ends of the springs 3, 3, which operate the closing levers 4, 4, of which in this instance there are two, are held clear of the sides of the aperture 5 of said levers and of the jaws 1, 1, and the upturned portion 6 of the frame 2 by means of downturned lugs 7, 7, as previously described in connection with Figs. 1, 2 and 3.

The trap illustrated in Figs. 4, 5 and 6, employs a method for retaining the spring end in position similar to that previously described in connection with Figs. 10, 11 and 12. In this instance, however, instead of lying flat against the under side of the lever 4, the end of the spring 3 is bent up out of the normal plane, as best illustrated in Fig. 6, whereby the spring bears against the lever 4 at practically two points only, one point being the extremity of the spring which abuts the downturned flange 8, and the other being at the point designated in Fig. 5 by the reference numeral 9. By such arrangement there is obviated a tendency, where but one spring is employed for actuating the closing lever 4, to distort the said lever by forcing up above the other that side of the lever under which the end of the actuating spring lies. It will be noted that the bearing points of the spring are at opposite sides of the lever, the pressure of the spring against the lever thereby being equalized, and there being no tendency for the lever to assume a position in which one side is higher or lower than the other.

A further feature of the invention resides in a novel method of mounting the springs 3, 3, which actuate the closing levers 4, and is illustrated in Figs. 4 to 9, inclusive. It is customary in traps of the type involved, to mount the coiled springs which operate the closing levers on rods suitably secured to the frame and usually constituting the pivot for the closing lever. In the usual construction however, this spring-holding rod is riveted or otherwise permanently secured in the structure and constitutes a fixed part of the frame. In the present instance, I provide a novel means for securing this rod in the frame which greatly facilitates assembly of the parts of the trap and provides means for facilitating detachment of the spring for replacement.

With special reference to Figs. 4, 5 and 6, it will be noted that in the present instance the frame 2 comprises portions 11 and 12 which lie at right angles to each other, the portion 11 including the members 6, 6, in which the jaws 1, 1, are mounted, and the portion 12 constituting a support for the treadle 13. In the present instance, the arm 11 of the base has pressed out in the form of a closed loop a part 14, this loop constituting means for retaining one end of a suitably formed rod 15 upon which the spring 3 is mounted. That portion of the rod 15 which extends under the loop also constitutes, as clearly illustrated, a journal or pivot for the closing lever 4. The rod extends from the loop 14 substantially parallel to the arm 12 of the frame, and this parallel portion of the rod is sufficiently long to accommodate a spring of the desired size, the rod then bending inwardly towards the arm 12, and from a position directly over this portion 12 downwardly through an aperture 16 in the latter, as well illustrated in Figs. 5 and 6.

One end of the spring 3, as illustrated in Fig. 5 and as previously described, underlies the closing lever 4, while the other end of the spring extends under the arm 12 of the frame, and the normal tension of the spring holds the rod 15 firmly in position in the frame, it being apparent that that end of the spring 3 which underlies the member 12 of the frame operates to prevent upward movement of this end of the said rod 15 and withdrawal of the downturned end of the rod from the aperture 16 which it occupies.

It will be apparent that this method of mounting the spring greatly facilitates the assembling of the parts of the trap, and involves no riveting or other means for securing the spring supporting rod in the frame. It will further be noted that the arrangement provides for ready removal of the rod 15 and release of the spring 3.

In Figs. 7, 8 and 9, I have shown the arrangement as applied to traps of the double lever type employing a separate spring for each of the levers 4, 4. The trap in this instance, as in the trap illustrated in Figs. 4, 5 and 6, comprises the frame cross arms 11 and 12, the arm 11 of the frame in this instance being provided with two of the aforedescribed loops 14, illustrated in Fig. 9, one loop being placed on each side of the arm 12 of the base. These loops constitute holding means for the ends of a U-shaped rod 17, which in effect is the equivalent of two of the rods 15 described in connection with the trap illustrated in Figs. 4, 5 and 6. In this instance, the cross part of the U-shaped rod 17 passes over the arm 12 of the base, and the extremities of the rod which pass through the loops 14 are turned upwardly, thereby to prevent accidental dislodgment of the ends of the rod from under the loops. In this instance, two springs 3, 3, are employed, which operate respectively the closing levers 4, 4, one end of each of the springs underlying its respective lever, and the other end underlying the arm 12 of the base.

The springs as previously described in regard to the traps illustrated in Figs. 4, 5 and 6, exert a normal pressure tending to hold the rod 17 down against the top of the arm 12 of the base, and the springs also function in the present instance in conjunction with the turned out ends of the rod 17 to prevent longitudinal movement of the rod 17 through the loops. The respective ends of the rod 17 which occupy the said loops 14 also, as in the present instance, constitute pivot shafts for the closing levers 4, 4.

A still further feature of the invention is illustrated in Figs. 10, 11 and 12, in which I have illustrated a trap comprising two individual sets of jaws, one set 1, 1, being actuated, as previously described, by means of a closing lever 4. In traps of this type, it has been customary to utilize the same spring, or springs, which actuates the closing lever 4, to actuate also the secondary jaws 21, 22. With reference to the drawings, it will be noted that the frame 2 comprises the usual cross arms 11 and 12, the arm 11 mounting the jaws 1, 1, in the usual manner, and the arm 12 mounting the treadle 13. The arm 12 in the present instance also has rigidly fixed thereto the fixed jaw 22 of the secondary jaws 21, 22, while the movable jaw 21 is pivotally mounted on a rod 23 whose ends are mounted in the fixed jaw 22 and which constitutes in addition to the pivot shaft of the jaw 21 the pivot shaft of the closing lever 4 and the mounting for the springs which actuate the trap. Ordinarily in traps of this type, it is customary to employ a pair of springs, one end of each of which underlies the closing lever 4, while the other ends underlie the movable jaw 21 whereby the same springs are made to actuate both the primary and secondary jaws. This arrangement, however, has the disadvantage of limiting the size of the spring which can be used in the trap owing to the fact that the springs must have sufficient flexibility to permit first, the opening of the secondary jaws in setting the jaws, and then the opening of the primary jaws. For this reason, it has been necessary to employ a comparatively light spring.

I have discovered means whereby traps of this nature may be provided with independent springs for operating the respective sets of jaws, thereby permitting the use of springs for either set of jaws of any weight that may be found desirable.

With reference to Figs. 10, 11 and 12, it will be noted that one end of the spring 3 underlies the closing lever 4, while the other end underlies the arm 12 of the frame. On the opposite side of the arm 11 of the frame from the spring 3, a second spring 24 is provided, one end of which underlies in the present instance a suitable lateral projection 25 on the movable jaw 21 of the secondary jaws, while the other end of the spring underlies the arm 12. The springs are entirely independent of each other and respectively actuate the primary and secondary jaws, and the tension of these springs can be regulated as found desirable.

I claim:

1. In an animal trap, the combination with animal gripping elements, of a substantially flat pivoted operating lever for said elements, a cylindrically wound spring for actuating the lever, said spring having its longitudinal axis substantially in the same plane with the pivotal axis of the lever and having one transversely projecting end lying against one face of the lever, and retaining means on the lever for said spring end.

2. In an animal trap, the combination with animal-gripping elements, of a substantially flat pivoted operating lever for said elements, a cylindrically wound spring for actuating the lever, said spring having its longitudinal axis in substantial alignment with the pivotal axis of the lever and having one transversely projecting end lying against one face of the lever, and retaining means on the lever for said spring end.

3. In an animal trap, the combination with animal-gripping elements, of an apertured plate constituting an operating lever for the latter, a flange at each side edge of the plate, and an actuating spring having one end bearing against the side of the plate along the inside of one flange with a lateral arm extending across the plate and abutting the inside of the other flange.

4. In an animal trap, the combination with animal-gripping elements, of a centrally apertured operating lever for the elements, an actuating spring extending at least in part along that part of the lever between the aperture and an outer side edge, and means for equalizing the pressure of the spring against said lever to prevent warping of the lever from its normal position.

5. In an animal trap, the combination with animal-gripping elements, of an operating lever for the elements having a central aperture, an actuating spring for the lever having one end lying between the side edge and the said aperture, and a lateral extension on said spring end extending across the lever and lying at an angle to the normal plane of the lever whereby the said spring is made to bear against the lever at points on each side of the aperture.

6. In an animal trap, the combination with a base, of animal-gripping elements mounted on the base, a spring for actuating said elements, and a member constituting a mounting for the spring detachably supported by the frame and positively retained in position by the tension of the spring.

7. In an animal trap, the combination with a base, of animal-gripping elements mounted on the base, a spring for actuating said elements, a rod constituting a support for the spring, and sockets on the base for the ends of said rod, said actuating spring positively preventing accidental dislodgment of the ends of said rod from the sockets.

8. In an animal trap, the combination with a frame comprising divergent arms, of animal-gripping elements mounted on one of said arms, a rod having its ends detachably secured in the respective arms, and an actuating spring for the said gripping elements mounted on the rod and normally positively preventing detachment of the ends of the rod from the respective arms.

9. In an animal trap, the combination with a base, of animal-gripping elements mounted on the base, a rod, a loop in the base adapted for the reception of one end of said rod, said base having an aperture adapted for the reception of the other end of the rod, and a spring mounted on the rod and constituting actuating means for the elements.

10. In an animal trap, the combination with a base comprising divergent arms, of animal-gripping elements mounted on one arm, a member extending from said arm and having its outer end supported by the other arm, and a spring carried by said member and adapted to actuate said elements.

11. In an animal trap, the combination with animal-gripping elements, of an operating lever for the elements pivotally mounted intermediate the jaw pivots, a single, coiled, actuating spring eccentrically engaging the lever, and means for equalizing the pressure of the spring against said lever to prevent warping of the lever from its normal position.

12. In an animal trap, the combination with animal-gripping elements, of a pivoted operating lever for said elements, a single, coiled actuating spring eccentrically engaging the lever, and means for equalizing the pressure of the spring upon the lever with respect to the pivot.

13. In an animal trap, the combination with a base, of animal-gripping elements mounted on the base, a spring for actuating said elements, and an angular supporting member for the spring detachably secured to the base and normally retained in the base by the tension of said spring.

14. In an animal trap, the combination with a base, of animal-gripping elements mounted on the base, a spring for actuating said elements, and an angular member constituting a mounting for the spring detachably supported by the frame and retained in position by the tension of the spring.

15. In an animal trap, the combination with a base comprising divergent members, of animal-gripping elements mounted on the base, a spring adapted to actuate said elements, and an angular member having its ends respectively and detachably held by said divergent base members and constituting a mounting for said spring.

16. In an animal trap, the combination with a base comprising divergent members, of animal gripping elements mounted on the base, a spring adapted to actuate said elements, and a member having its ends respectively and detachably held by said divergent base members and constituting a mounting for said spring.

WALTER A. GIBBS.